United States Patent
Makabe et al.

(10) Patent No.: US 9,410,622 B2
(45) Date of Patent: Aug. 9, 2016

(54) TRANSMISSION SYSTEM FOR VEHICLE

(71) Applicant: HONDA MOTOR CO., LTD., Tokyo (JP)

(72) Inventors: Takumi Makabe, Wako (JP); Dai Arai, Wako (JP); Yohei Endo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/669,413

(22) Filed: Mar. 26, 2015

(65) Prior Publication Data

US 2015/0274171 A1 Oct. 1, 2015

(30) Foreign Application Priority Data

Mar. 28, 2014 (JP) ................ 2014-069505

(51) Int. Cl.
| F16H 61/32 | (2006.01) |
| F16H 63/18 | (2006.01) |
| F16H 63/46 | (2006.01) |
| F16H 61/28 | (2006.01) |

(52) U.S. Cl.
CPC ............. *F16H 61/32* (2013.01); *F16H 63/18* (2013.01); *F16H 63/46* (2013.01); *F16H 2061/2823* (2013.01)

(58) Field of Classification Search
None
See application file for complete search history.

(56) References Cited

U.S. PATENT DOCUMENTS

| 2010/0082210 | A1* | 4/2010 | Kobayashi | F16H 59/72 701/66 |
| 2011/0226080 | A1* | 9/2011 | Ieda | F16H 63/14 74/473.36 |
| 2011/0239805 | A1* | 10/2011 | Fujimoto | F16H 59/70 74/473.12 |

FOREIGN PATENT DOCUMENTS

JP    11-082734    3/1999

* cited by examiner

*Primary Examiner* — Edwin A Young
(74) *Attorney, Agent, or Firm* — Rankin, Hill & Clark LLP

(57) ABSTRACT

A transmission system for optimally re-engaging a shift clutch irrespectively of running conditions of the vehicle. In the transmission system for a vehicle in which a shift clutch is actuated interlockedly with a shift spindle rotationally driven by a shift motor, a target clutch torque for the shift clutch is calculated based on an estimated engine torque derived from an estimated engine torque map which prescribes the relation between engine rotational speed, throttle angle, and estimated engine torque, and a target shift spindle angle is calculated based on a value derived from a target shift spindle angle map which prescribes the relation between the target clutch torque and the target shift spindle angle. A control unit controls the shift motor based on the target shift spindle angle calculated by a target shift spindle angle calculator, at the time of effecting a gear shift of a transmission.

12 Claims, 6 Drawing Sheets

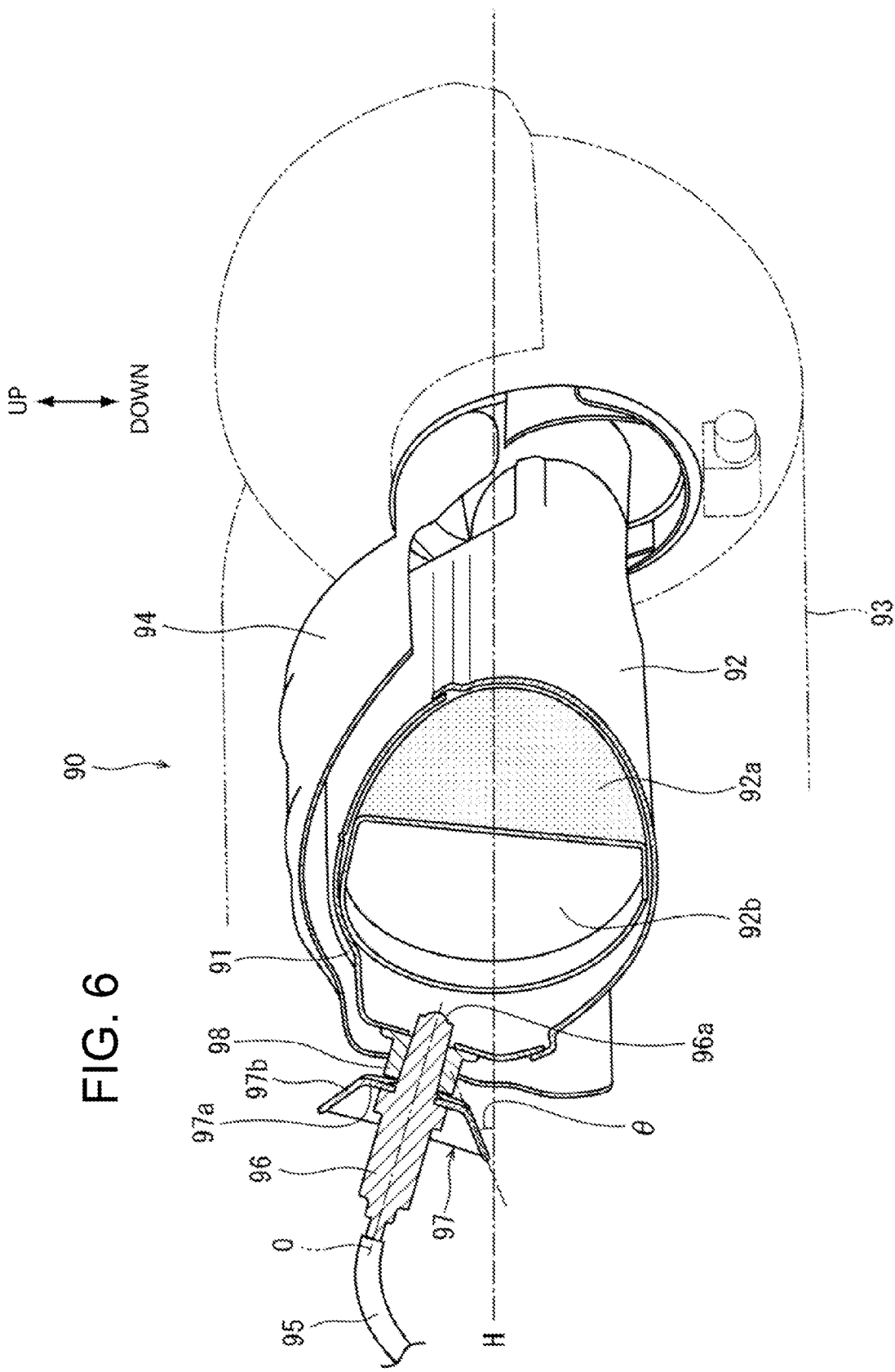

TRANSMISSION SYSTEM FOR VEHICLE

BACKGROUND OF THE INVENTION

1. Field of the Invention

The present invention relates to a transmission system for a vehicle, particularly to a transmission system for a vehicle that performs a shift between gear positions and engagement/disengagement of a clutch in an interlocked manner by using a single actuator.

2. Description of Related Art

A transmission system for a vehicle in which a shift operation of a sequential-type staged transmission formed to be integral with an engine of a motorcycle or the like is performed using an actuator, such as an electric motor, is known in the art.

For example, Japanese Patent Laid-Open No. Hei 11-082734 discloses a transmission system for a vehicle in which a shift drum for switching between transmission gear trains and a shift clutch for momentary interruption of transmission of a rotational driving force are connected to a single shift spindle, and the shift spindle is rotated by an actuator so as to perform a shift operation while operating the shift drum and the shift clutch in an interlocked manner.

The shift spindle is configured to reciprocally turn between an initial position and a position of a predetermined angle (for example, 30 degrees) on a normal rotation side or a reverse rotation side in order to activate an intermittent feeding mechanism of the shift drum. On the other hand, the shift clutch is in an engaged state when the shift spindle is in the initial position, and the shift clutch is changed over into a disengaged state in the course of the shift spindle being brought to the predetermined-angle position.

In addition, in the transmission system for a vehicle described in Japanese Patent Laid-Open No. Hei 11-082734, for realizing both a shortening of the shifting time and a reduction in a shift shock, a special setting is adopted. Namely, in the former or first half of the shift operation, the shift spindle is driven at a high speed so as to swiftly change the shift position (gear position). On the other hand, in the latter or second half of the shift operation to the returning of the shift spindle into its initial position, the driving speed for the shift spindle is lowered so that the shift clutch is re-engaged gently.

In the technology described in Japanese Patent Laid-Open No. Hei 11-082734, however, the mode of operation of the actuator during the period from the time a shift command is inputted through a shift switch or the like to the time the re-engagement of the shift clutch is completed is previously determined. In this case, it is not taken into consideration to perform an optimum re-engaging operation for the shift clutch according to the running conditions of the vehicle, such as vehicle speed and throttle angle.

SUMMARY OF THE INVENTION

The present invention is directed toward a transmission system for a vehicle by which the aforementioned problem involved in the related art can be solved and which enables a shift clutch to be re-engaged in an optimum manner irrespectively of running conditions of the vehicle.

In accordance with the present invention, the transmission system for a vehicle includes a transmission disposed between an engine and a driving wheel, and a shift clutch adapted to transmit, and stop transmitting, a rotational driving force between the engine and the transmission. The transmission includes a plurality of gear trains for gear positions, a shift fork adapted to change selection among the gear trains, a shift drum adapted to drive the shift fork, and a shift spindle adapted to drive the shift drum. The shift clutch is actuated interlockedly with the shift spindle, which is rotationally actuated by an actuator.

The transmission system further includes a shift spindle angle detector that detects a rotational angle of the shift spindle, an engine rotational speed detector that detects an engine rotational speed by a crank pulser, a vehicle speed detector including a vehicle speed sensor, a control unit adapted to drive the actuator, a target clutch torque calculator that calculates a target clutch torque to be generated on the shift clutch, based on an estimated engine torque derived from an estimated engine torque map, which prescribes a relation between the engine rotational speed, a throttle angle, and an estimated engine torque; and a target shift spindle angle calculator that calculates a target shift spindle angle, based on a value derived from a target shift spindle angle map, which prescribes a relation between the target clutch torque and the target shift spindle angle. The control unit controls the actuator, based on the target shift spindle angle calculated by the target shift spindle angle calculator at a time of a gear shift of the transmission.

Therefore, by calculating the target clutch torque based on the engine torque estimated from the engine rotational speed and the throttle angle, it is possible to set the target clutch torque in a shift operation at a required minimum magnitude, and to control the driving of the actuator so as to realize the thus set target clutch torque. Accordingly, the clutch capacity during a shift operation can be maintained at a necessary and sufficient proper capacity. Consequently, it is possible to avoid generation of a feeling of free running or a shift shock due to a delayed clutch engagement or too early a clutch engagement, at the time of re-engaging the shift clutch after a changeover of the transmission gear trains.

In further accordance with the present invention, the target shift spindle angle calculation calculator adds a corrective amount according to an engine rotational speed converging rate when calculating the target shift spindle angle. This ensures that at the time of re-engaging the shift clutch subsequently to the switching between the transmission gear trains, it is possible to achieve a re-engaging operation in accordance with an engine rotational speed converging rate (time differential of clutch slip rotation ("the difference between an actual engine rotational speed Ne and an engine rotational speed estimated from the rear-wheel vehicle speed") in the clutch engaged state). Accordingly, individual differences in the frictional force generated in response to a given driving amount of the shift clutch are absorbed. Consequently, it is possible to achieve the same or equivalent clutch re-engagement control, without being influenced by manufacturing errors or the degrees of wear of the clutch disc.

In further accordance with the present invention, the target shift spindle angle calculator adds a corrective amount derived from shifts carried out so far, as a learned value, when calculating the target shift spindle angle. This enables a shift clutch control with a higher accuracy to be achieved as the running distance of the vehicle increases.

In further accordance with the present invention, the transmission system further includes a plurality of shift-time additive torque maps according to the gear positions before and after a gear shift, wherein the target clutch torque calculator adds a shift-time additive torque derived by use of the shift-time additive torque map as a corrective amount when calculating the target clutch torque. For this reason, the shift clutch can be controlled so as to absorb engine torque fluctuations generated at the time of a change of the shift position.

In further accordance with the present invention, the target clutch torque calculator calculates the target clutch torque through multiplying the target torque, which is obtained through the addition of the shift-time additive torque, by a correction coefficient prescribed taking a clutch slip ratio into account. This ensures that even if there exists such a characteristic that the proportional relation between the clutch pressure and the frictional force cannot be maintained because the bite or grip of the shift clutch becomes better, for example, in a predetermined region in the beginning of engagement of the shift clutch and in a predetermined region immediately before perfect engagement of the shift clutch, it is possible to execute a smooth shift clutch control while coping with such a characteristic.

BRIEF DESCRIPTION OF THE DRAWINGS

These and further features of the invention will be apparent from the following description and drawings, wherein:

FIG. 6 is a sectional view taken along line IV-IV of FIG. 1.

DETAILED DESCRIPTION OF THE INVENTION

Figure 1:
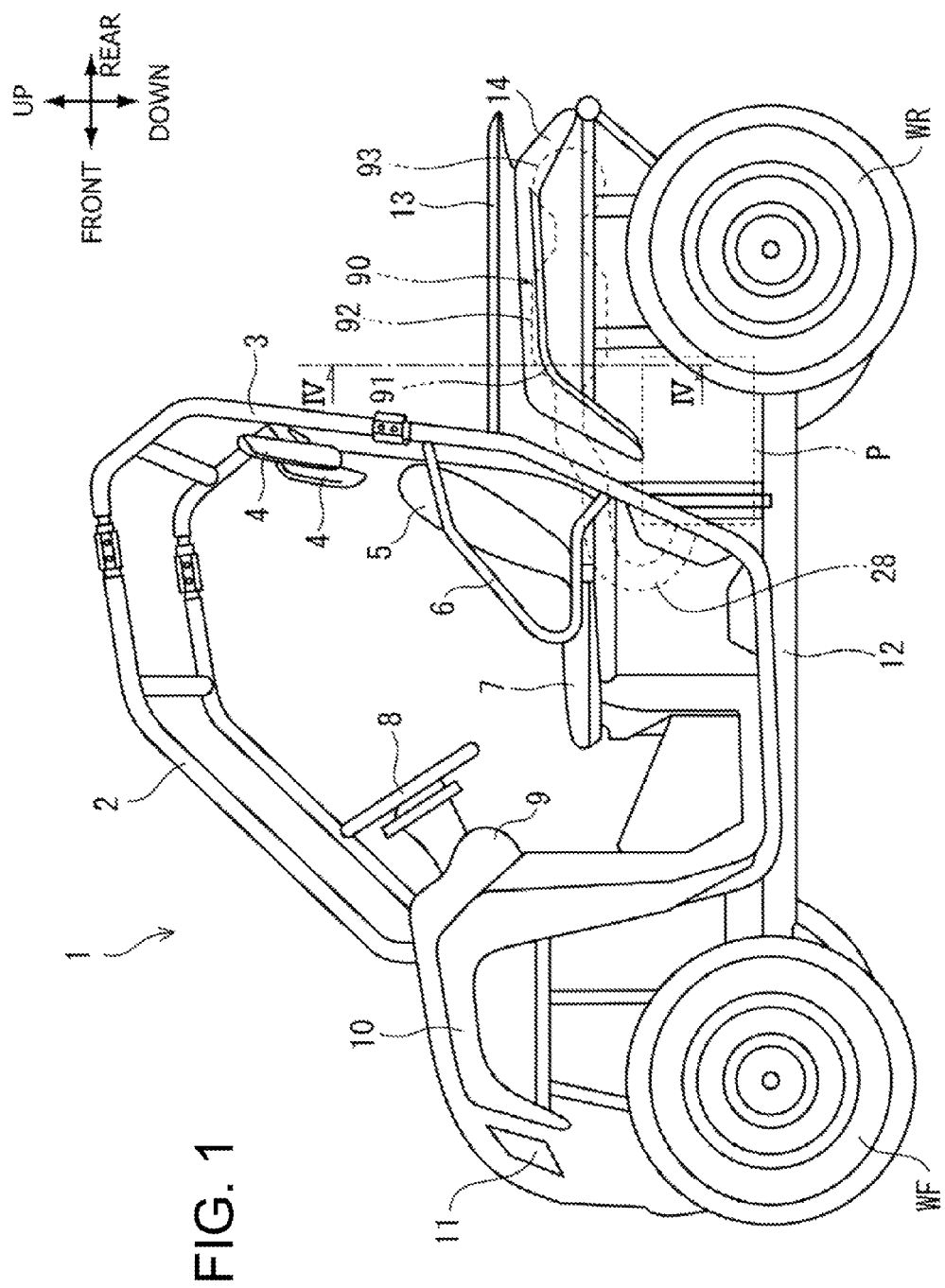
FIG. 1 is a left side view of an MUV vehicle to which a transmission system for a vehicle according to an embodiment of the present invention has been applied.

Now, a preferred embodiment, disclosed by way of example, of the present invention will be described below, referring to the drawings. FIG. 1 is a left side view of an MUV (multi-utility vehicle) vehicle 1 to which a transmission system for a vehicle according to the present invention has been applied. The MUV vehicle 1 is a multipurpose four-wheel vehicle in which left and right front wheels WF and left and right rear wheels WR are rotatably shaft-supported on a body frame 12, and a driving force is supplied to either or both of the front wheels WF and the rear wheels WR from a transmission-integrated power unit P disposed at a lower portion in a rather rear position of a vehicle body, whereby the vehicle is made to run.

A riding space for two persons, which is surrounded by left and right front roll bars 2 and left and right rear roll bars 3, is provided over a front portion of the power unit P. Seating portions 7 and backrest portions 5 are provided in left-right pairs. Headrests 4 and rider guard members 6 are attached to the rear roll bars 3. In front of an instrument panel 9 to which a steering wheel 8 is attached, fenders 10 for the front wheels WF are mounted. A pair of headlamps are disposed at front portions of the vehicle body. Fenders 14 for the rear wheels WR are mounted on a rear upper side of the power unit P, and a rear carrier 13 is attached to upper portions of the fenders 14.

The power unit P according to this embodiment is configured so that a shift of a staged transmission and engagement/disengagement of a shift clutch can be performed in an interlocked manner. This ensures that shift operations during running can be effected by only operating a shift-up switch and a shift-down switch (see FIG. 3) provided in the vicinity of the steering wheel 8.

An exhaust system 90 for guiding a combustion gas from the power unit P to the rear of the vehicle body includes an exhaust pipe 28 extending rearward with an offset to the left side in the vehicle width direction, a catalyst unit 92 connected to a rear end of the exhaust pipe 28, and a cylindrical muffler 93 connected to a rear end of the catalyst unit 92 and extending in the vehicle width direction. The catalyst unit 92 has a taper portion 91 enlarged in diameter in the shape of a side surface of a cone on the rear side of the exhaust pipe 28, for housing a catalyst main body (see FIG. 6), which has a large-diameter cylindrical shape.

Figure 2:
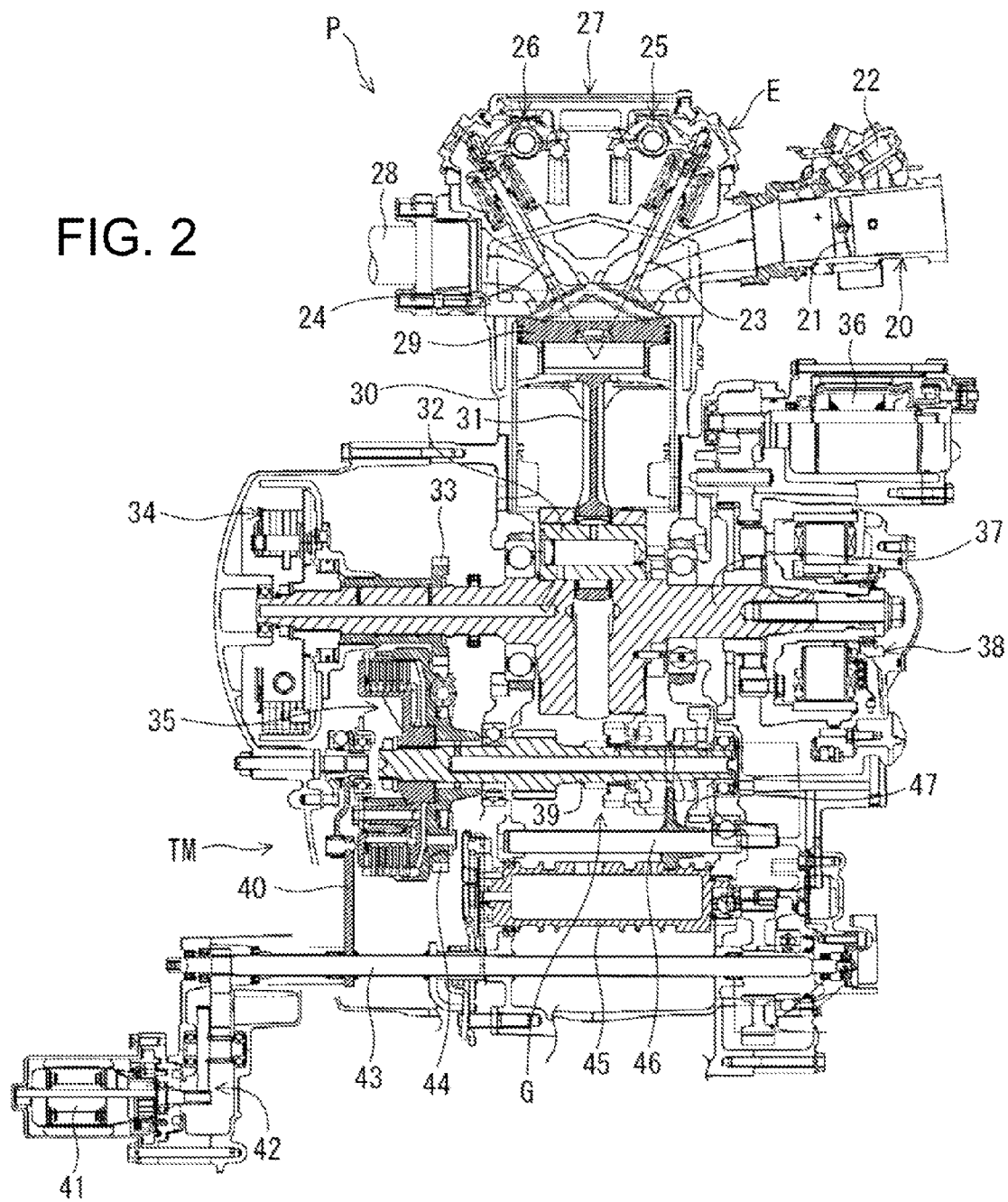
FIG. 2 is a sectional view of a power unit to which the transmission system for a vehicle according to the present invention has been applied.

FIG. 2 is a sectional view of the power unit P. The power unit P integrally includes a four-stroke-cycle single-cylinder engine E, and the staged transmission TM having an electric change mechanism operated by a shift motor 41. In a cylinder 30 of the engine E, a piston 29 connected to a connecting rod 31 is slidably contained. The other-end portion of the connecting rod 31 is rotatably supported on a crankshaft 37 through a crank pin 32.

Valve mechanisms 25 and 26 for an intake valve 23 and an exhaust valve 24 are housed over the cylinder 30. The exhaust pipe 28 communicating with the muffler (not shown) is connected to an outlet side of an exhaust port, which is opened and closed by the exhaust valve 24. To an inlet side of an intake port, which is opened and closed by the intake valve 23, on the other hand, a throttle body 20 is connected through an intake manifold. A butterfly-type throttle valve 21 and an injector 22 of a fuel injection system are housed in the throttle body 20.

An inner rotor type AC generator 38 is attached to a right end portion (in the figure) of the crankshaft 37. In the vicinity of the AC generator 38, there is disposed a starter motor 36 for starting the engine E by rotating the crankshaft 37. A centrifugal clutch 34 functioning as a starting clutch is attached to a left end portion (in the figure) of the crankshaft 37. A rotational driving force of the crankshaft 37 is outputted to the side of the transmission TM through a primary drive gear 33 when the centrifugal clutch 34 has reached a rotational speed for engagement.

The rotation of a primary driven gear 44 in mesh with the primary drive gear 33 is transmitted through a shift clutch 35 to a main shaft 39. The transmission TM has five sets of the gear trains G provided between the main shaft 39 and a counter shaft (not shown), whereby five forward gear positions are formed. In this exemplary embodiment, in addition, there is provided a reverse gear train between the main shaft 39 and a reverse shaft (not shown). A rotational driving force having undergone a speed reduction by a selected one of the gear trains G is transmitted through a differential mechanism (not shown) to the driving wheels.

A shift operation of the transmission TM is carried out by driving of the single shift motor 41, according to a driver's shift-switch operation. A shift arm 47 for selecting the gear train G through which to transmit the rotational driving force is in axially slidable engagement with a guide pin 46. According to a rotation of a shift drum 45, the shift arm 47 is slid into a predetermined position, thereby switching the engagement of dog clutches between gear trains.

The shift drum 45 is so configured that the shift positions (five forward gear positions plus one reverse gear position) correspond to preset predetermined angles thereof, respectively. A setting is made as follows. When a shift spindle 43 is rotated by a predetermined angle to one side by the shift motor 41, the shift drum 45 is intermittently fed (for example, by 30 degrees) to one side; on the other hand, when the shift spindle 43 is rotated by a predetermined angle to the other side, the shift drum 45 is intermittently fed to the other side.

In addition, a clutch operating arm 40 for operating the shift clutch 35, which is of a normally closed type, is connected to the shift spindle 43. The clutch operating arm 40 is so configured as to disengage the shift clutch 35, interlockedly with a rotation of the shift spindle 43 from an initial position to the one side or the other side. More specifically, the shift clutch 34 is so configured that the shift clutch 34 is in an engaged state when the shift spindle 43 is in a neutral position and that the shift clutch 34 is put into a completely disengaged state when the shift spindle 43 is rotated to a predetermined angle for intermittent feeding of the shift drum 45.

In this embodiment, by operating the shift switch provided in the vicinity of the steering wheel of the MUV vehicle, the shift spindle 43 is actuated by the shift motor 41, whereby disengagement of the shift clutch and switching between the gear trains are effected in an interlocked manner. The shift motor 41 is connected to the shift spindle 43 by way of a speed reduction gear group 42. Note that, for example, a stepping motor capable of accurate control of driving angle and driving speed can be used as the shift motor 41, which serves as an actuator. In the following, the entire configuration including the transmission TM provided with the shift mechanism and the shift clutch, which are controlled by the shift motor 41, as well as the control unit (see FIG. 3) which controls the shift motor 41 will be referred generally as the transmission system for a vehicle.

Due to the aforementioned structure, the speed at which the shift clutch 35 is disengaged and re-engaged varies according to the driving speed of the shift motor 41, which drives the shift spindle 43. The driving of the shift motor 41 may be so configured that in its former or first half stage for rotating the shift spindle 43 to one side for intermittent feeding of the shift drum 45, the shift motor 41 is driven at a high speed so as to complete the switching between the transmission gear trains early, and, in its latter or second half stage for re-engaging the shift clutch 35 for restarting the transmission of the driving force, the driving speed is lowered so as to gently re-engage the shift clutch 35.

Figure 3:
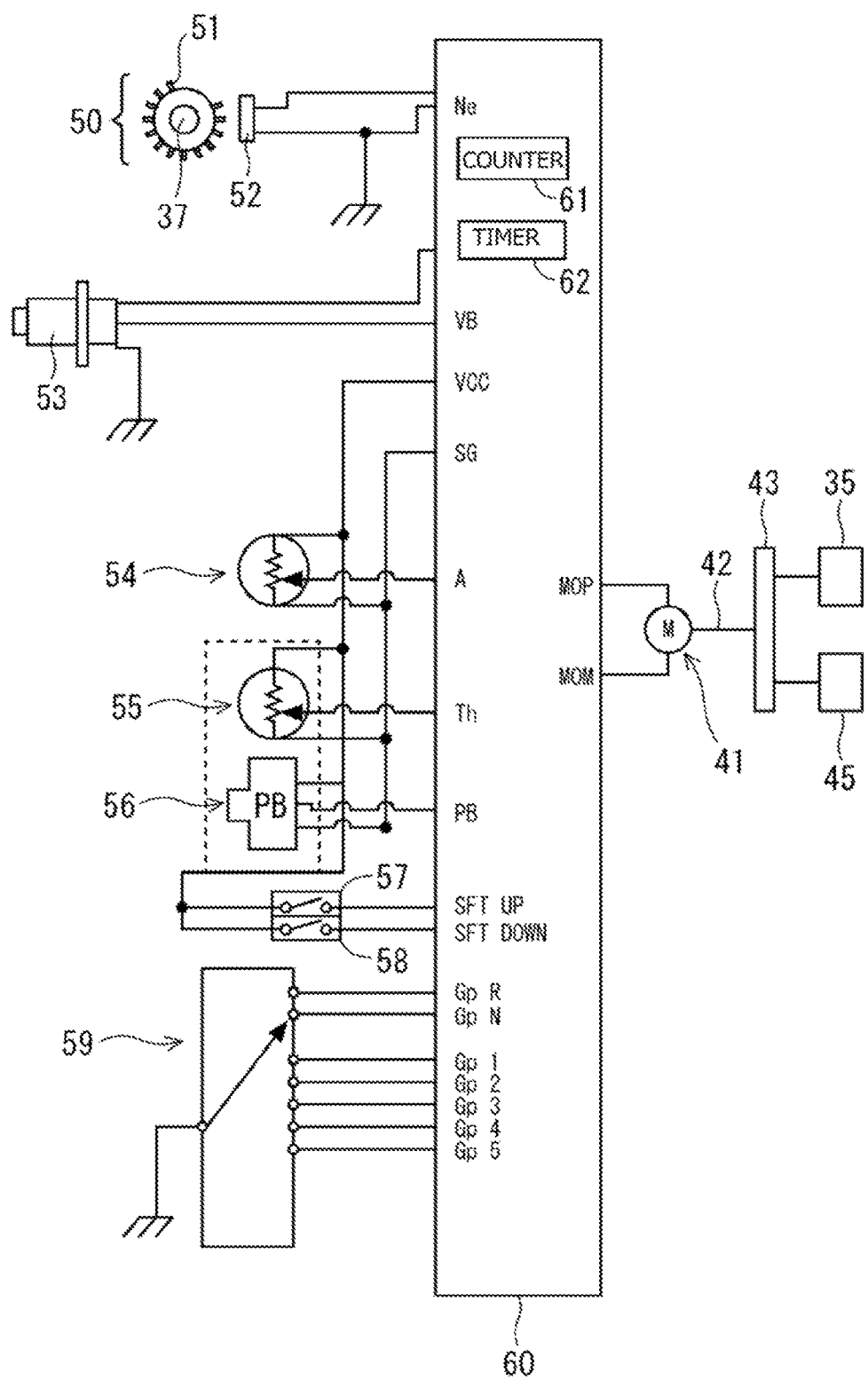
FIG. 3 is a block diagram showing the configuration of a control unit and periphery equipment.

FIG. 3 is a block diagram showing the configuration of a control unit 60 and peripheral equipment. A variety of information for controlling the shift motor 41 is inputted to the control unit 60. Projections 51 provided on the crankshaft 37 and a pick-up coil 52 for detecting the passing conditions of the projections 51 constitute engine rotational speed detector or detection means 50 for detecting an engine rotational speed Ne on the basis of a crank pulser. The engine rotational speed Ne is calculated by use of the number of times of passing of the projection 51, which is stored in a counter 61, and a time measured by a timer 62.

Besides, various kinds of information are inputted to the control unit 60 respectively from: a vehicle speed sensor 53 as vehicle speed detector or detection means for detecting a vehicle speed VB on the basis of the rotational speed of the rear wheels WR; a shift spindle angle sensor 54 as spindle angle detector or detection means for detecting a rotational angle A of the shift spindle 43; a throttle angle sensor 55 for detecting a throttle angle Th set by a driver's operation; an atmospheric pressure sensor 56 for detecting an atmospheric pressure PB; a shift-up switch 57 and a shift-down switch 58 as an operator or operating means for the driver to issue a gear shift command; and a gear position sensor 59 for detecting a gear position Gp, i.e., the position of the selected one of the gear trains G of the transmission TM.

Figure 4:
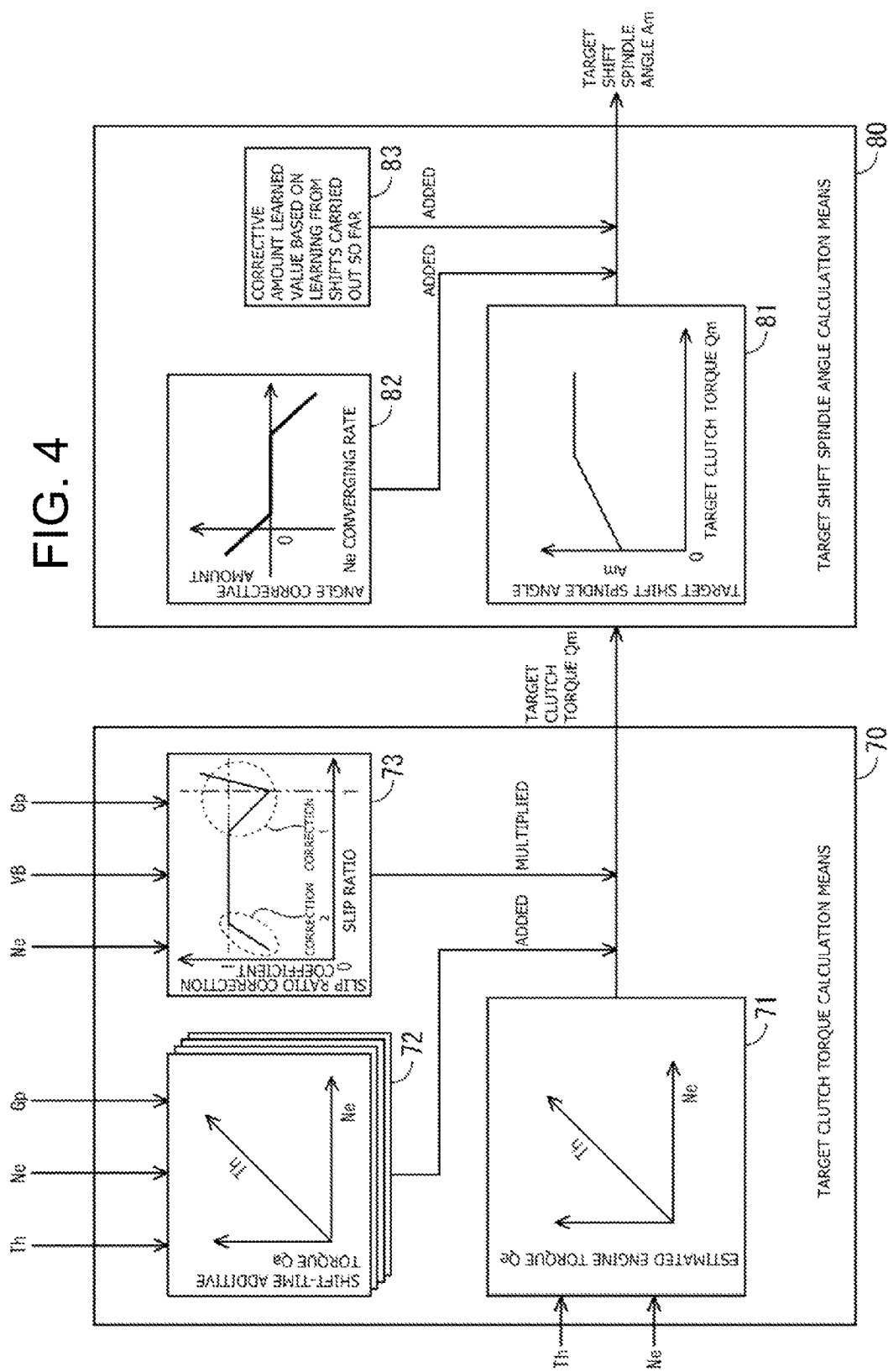
FIG. 4 is a functional block diagram showing means for calculating a target shift spindle angle to be used in a drive control of a shift spindle.
Figure 5:
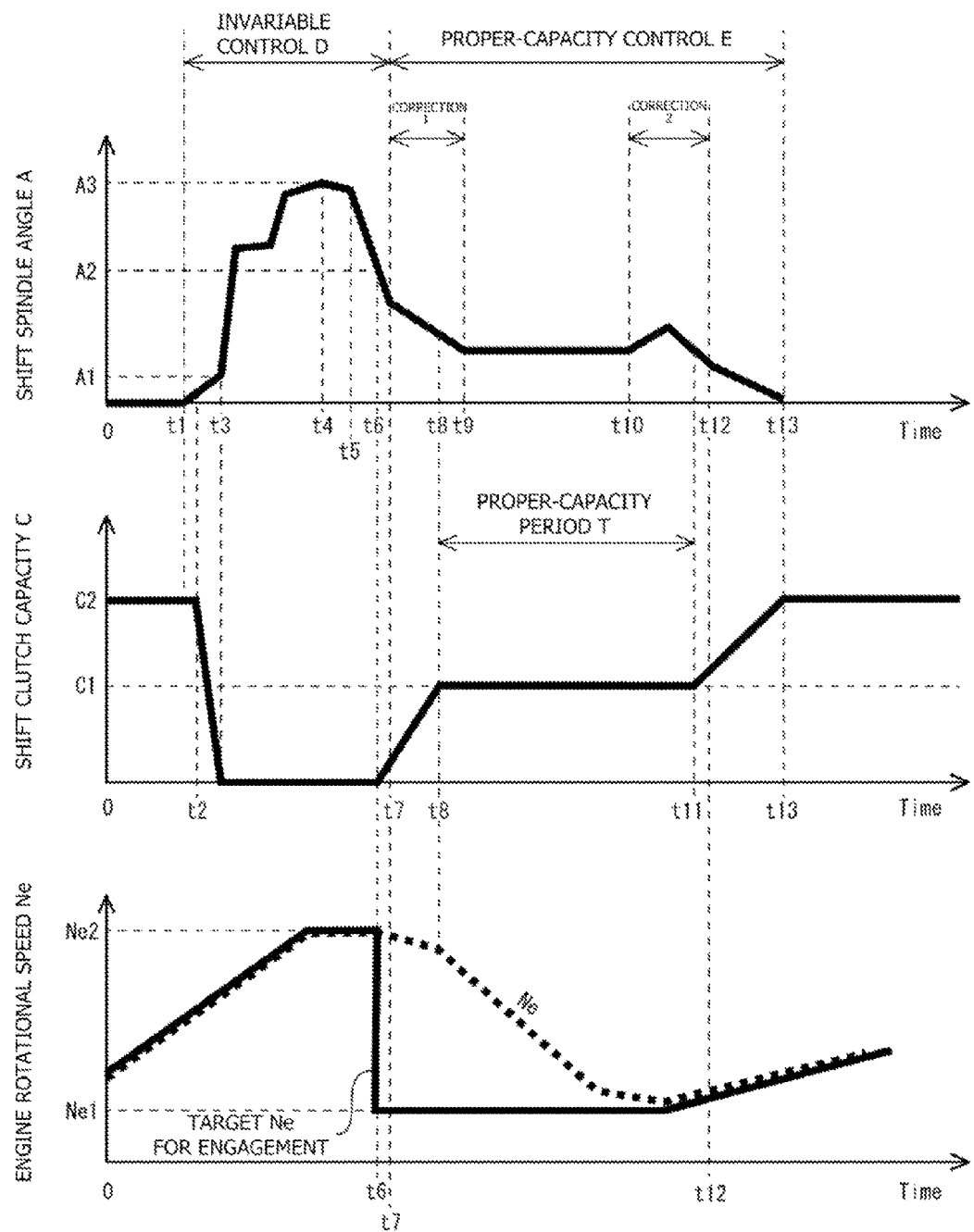
FIG. 5 is a graph showing a mode of a shift spindle control in a case where a proper-capacity control according to the present invention is executed.

FIG. 4 is a functional block diagram showing means for calculating a target shift spindle angle Am to be used in controlling the driving of the shift spindle 43. FIG. 5 is a graph showing a mode of a shift spindle control in a case where a proper-capacity control according to the present invention is executed. Of the graph in FIG. 5, the upper portion represents variations in shift spindle angle A indicative of the driving angle of the shift spindle 43, the middle portion represents variations in shift clutch capacity C as a clamping force in the shift clutch 35, and the lower portion represents variations in the engine rotational speed Ne. The example shown in this figure corresponds to a control mode in a case of a shift-up (for example, from second gear to third gear) during acceleration of the MUV vehicle 1.

The transmission system for a vehicle according to this embodiment of the present invention is so set as to successively apply an invariable control D and a proper-capacity control E as shown in FIG. 5, at the time of performing a drive control over the shift spindle 43 according to an operation of the shift-up switch 57 or the shift-down switch 58. In the example shown in the figure, the process from the starting of the drive of the shift spindle 43 at time t1 upon detection of a driver's shift-switch operation to the returning of the shift spindle 43 into its initial position at time t13 corresponds to the entirety of the shift operation.

Of the whole shift control process, the invariable control D in the period from time t1 to time t6 is a control mode prescribed for a swift and reliable changeover of the gear position, in which the driving of the shift spindle 43 is always controlled in a fixed pattern, irrespective of the throttle angle Th, the gear position Gp, or the like.

As for the former half portion of the shift operation in which a shift from one gear position to a next gear position is conducted while disengaging the shift clutch, setting the control mode for this portion to a constant mode will not produce any problem. In the transmission system for vehicle in which a shift clutch is interlocked with a shift spindle as in this exemplary embodiment, however, an operation of returning the shift spindle into its initial position is directly connected to the re-engaging operation of the shift clutch. If the whole shift operation is conducted under an invariable control as in the prior art, therefore, a shift shock or the like problem may occur in the latter half of the shift operation, depending on the running conditions of the vehicle.

In contrast, according to the embodiment of the present invention, the proper-capacity control E using a target clutch torque Qm is executed in the latter half portion from time t6 on, so as to perform a re-engaging operation according to the running conditions of the vehicle. This enables the driving of the shift spindle 43 to be controlled so that a feeling of free running or a shift shock will not be brought about in the latter half of the shift operation.

Referring to FIG. 4, the control unit 60 includes a target clutch torque calculator or calculation means 70 and a target shift spindle angle calculator or calculation means 80. In the target clutch torque calculator 70, first, a throttle angle Th and an engine rotational speed Ne are put into an estimated engine torque map 71, which is prescribed through experiments or the like, to derive an estimated engine torque Qe. A shift-time additive torque Qa derived from a shift-time additive torque map 72 is added to the estimated engine torque Qe, and the resulting sum is multiplied by a slip ratio correction coefficient (having a value of from 0 to 1) derived from a slip ratio correction coefficient map 73, whereby a target clutch torque Qm is calculated.

The reason why a feeling of free running or a shift shock is generated in the latter half of the shift operation lies in that the engaging operation at the time of re-engaging the shift clutch is too early or too late, that is, the actual clutch capacity is too large or too small as compared with an ideal clutch capacity. In this connection, if a control along the target clutch torque Qm which is a minimum clutch torque necessary for transmission of a driving force can be achieved at the time of re-engaging the shift clutch 35, it is possible to prevent the feeling of free running and the shift shock from being generated in the latter half of the shift operation.

The shift-time additive torque map 72 is a map for deriving an engine torque that fluctuates upon a shift of the gear position Gp, based on information on throttle angle Th, engine rotational speed Ne, and gear position Gp. Accordingly, in the shift-time additive torque map 72, which is preliminarily determined through experiments or the like, there are prepared a total of eight data maps corresponding to both shift-up operations and shift-down operations between the gear positions exclusive of the reverse gear.

The slip ratio correction coefficient map 73 is a map used for achieving a smooth re-engagement of the shift clutch. To be more specific, there is known a characteristic (μ-V characteristic) such that the proportional relation between the driving amount of the shift spindle 43 (the force with which the clutch disc is pressed) and the clutch capacity cannot be maintained, because the bite or grip of the shift clutch becomes better (the coefficient of friction is enhanced relatively), in a predetermined region in the beginning of engagement of the shift clutch and in a predetermined region immediately before perfect engagement of the shift clutch. Paying attention to this characteristic, the slip ratio correction coefficient map 73 is used for effecting a smooth re-engagement of the shift clutch, without being influenced by the characteristic.

The slip ratio correction coefficient map 73 is preliminarily determined through experiments or the like, is stored in the control unit 60, and is used for calculation of the target clutch torque Qm. The slip ratio used here is a slip ratio related to the ratio in rotational speed between the input side and the output side of the shift clutch, with its value being 1 (one) at the start of engagement of the shift clutch and being 0 (zero) at the completion of engagement.

The slip ratio correction coefficient is for correcting the estimated engine torque Qe according to this slip ratio. In this exemplary embodiment, as illustrated in the slip ratio correction coefficient map 73 in FIG. 4, the correction coefficient is set to be smaller, particularly, in a predetermined section where the clutch is in a nearly perfectly engaged state (the region of Correction 2) and a predetermined section around a point where the clutch is completely disengaged (the region of Correction 1). This makes it possible to prevent the shift clutch 35 from being over-engaged in the just-mentioned two predetermined sections due to the μ-V characteristic, and to thereby restrain the generation of a shift shock.

Next, the target clutch torque Qm calculated by the target clutch torque calculator 70 is inputted to the target shift spindle angle calculator 80, for obtaining an angle (driving amount) of the shift spindle 43 corresponding thereto. In the target shift spindle angle calculator 80, first, the target clutch torque Qm is put into a target shift spindle angle map 81 prescribed through experiments or the like, to derive a target shift spindle angle Am. The target shift spindle angle map 81 shown in FIG. 4 represents a state in which a return amount of the shift spindle 43 gradually increases with an increase in the target clutch torque Qm, on the assumption that the shift spindle 43 is in the state of having been turned to a predetermined angle (with the shift clutch being in a completely disengaged state). When the shift spindle 43 is returned into its initial position, the shift clutch 35 of the normally closed type is put into a perfectly engaged state by a biasing force of a clutch spring (not shown).

The target shift spindle angle Am derived from the target shift spindle angle map 81 is subjected to addition thereto of both an angle corrective amount derived from an angle corrective amount map 82 and a corrective amount learned value 83 based on the learning from the shifts carried out so far. The result of the addition is outputted as a numerical value to be used for control of the shift motor 41.

The angle corrective amount map 82 is a map prescribed through experiments or the like for deriving an angle corrective amount which is to be added to or subtracted from the target shift spindle angle Am according to a Ne converging rate (converging rate of engine rotational speed, i.e., time differential of clutch slip rotation ("the difference between an actual engine rotational speed Ne and an engine rotational speed estimated from the rear-wheel vehicle speed") in the clutch engaged state). This angle corrective value is so set as to increase in the vicinity of a point where the Ne converging rate is zero, and to decrease in a predetermined region where the Ne converging rate is high. When a re-engaging operation according to this Ne converging rate is possible, individual differences in the frictional force generated in response to a given driving amount of the shift clutch are absorbed. Consequently, it is possible to achieve the same or equivalent clutch re-engagement control, without being influenced by manufacturing errors or the degrees of wear.

On the other hand, as the corrective amount learned value 83, there can be applied, for example, an average of corrective amounts which have been applied at the times of the shifts carried out so far. This ensures that a shift clutch control with a higher accuracy can be achieved as the running distance of the vehicle increases.

In this embodiment, the target shift spindle angle Am is calculated as a value for control of the driving of the shift motor 41. In the case where a shift motor whose turning amount increases in proportion to the magnitude of a voltage impressed thereon is applied, a control substantially the same as that in this embodiment can also be performed by deriving a target shift spindle voltage. In that case, the rotational angle of the shift spindle 43 can be managed by the voltage supplied to the shift motor 41.

Referring to FIG. 5, a flow of a shift spindle drive control will be confirmed. In this example, description will be made of a control flow in a case where a shift-up to the third gear position is conducted during when the MUV vehicle 1 is being accelerated in the second gear. At time t=0, the MUV vehicle 1 is being accelerated in the second gear, and the shift clutch capacity C is at a capacity C2 corresponding to a perfectly engaged clutch state (excessive clutch capacity state). At time t1, a prescribed "invariable control" is started according to a driver's operation of the shift-up switch 57. Simultaneously, calculation of Ne converging rate is started, which is continued up to time t13.

After the rotation of the shift spindle 43 is started at time t1, the shift clutch capacity C starts being reduced from the capacity C2 at time t2. When the shift spindle 43 reaches an angle A1 at time t3, the shift clutch capacity C is reduced to zero; from this condition, a driving of the shift spindle 43 toward disengagement at a maximum speed is started. Then, after a standby for waiting for the meshing of a dog clutch of the newly selected transmission gear pair to be settled, the shift spindle 43 reaches a predetermined angle A3 at time t4, at which a secure abutment treatment is achieved.

From time t4 on, a control in a direction for returning the shift spindle 43 from the predetermined angle into its initial position is conducted. During a period from time t4 to time t5, the shift spindle 43 is slightly returned from the angle A3. Thereafter, during a period from t5 to t7, a driving of the shift spindle 43 in a returning direction at a high speed is carried out. In the example shown in this figure, the clutch capacity C starts rising at time t6. An angle A2 of the shift spindle 43 is an angle at which the shift clutch is in a partial clutch engagement state.

The invariable control D performed from time t1 to time t7 is prescribed for a rapid shift operation, and is uniformly executed independently of the gear position or the like. At time t5, the calculation of the target shift spindle angle Am to be used in the proper-capacity control E has been started. The high-speed returning in the period from time t5 to time t7 is continued until a Ne converging rate of not less than a predetermined value has appeared for a time not shorter than a prescribed time, while rapidly engaging the shift clutch in order to prevent a feeling of free running from being generated due to an abrupt drop in engine rotational speed Ne. In other words, a transition to the proper-capacity control E is made at time t7 when a Ne converging rate of not less than a predetermined value has appeared for a time not shorter than a prescribed time.

Then, the proper-capacity control E according to the embodiment of the present invention is executed from time t7 onward. During a period from time t7 to time t9, particularly, the shift spindle 43 is driven under an influence of Correction 1 in the slip ratio correction coefficient (the driving speed is reduced for preventing a shift shock from being caused by an abrupt engagement). At time t8, the clutch capacity C reaches a proper capacity C1. With the rapid returning executed from time t5 to time t7, the length of time from the time the shift clutch starts moving in a re-engaging direction to the time the proper capacity C1 is reached is shortened successfully.

The subsequent section of time from time t9 to time t10 is a section where a proportional relation is kept established between the slip ratio and the clutch capacity C. Throughout this section, the shift spindle angle A is kept at a fixed value between the angle A1 and the angle A2. Concurrently, the shift clutch capacity C is kept at the proper capacity C1, which is necessary and sufficient in relation to the magnitude of the engine torque. This ensures that the engine rotational speed Ne can be reduced at an optimum rate. Then, from time t10 to time t12, especially, the shift spindle 43 is driven under an influence of Correction 2 in the slip ratio correction coefficient.

At time t11, a proper-capacity period T ends, and the clutch capacity C starts increasing toward a perfect engagement state. In this stage, the engine rotational speed Ne has already coincided with a target Ne for engagement, so that a smooth transition to a post-shift rotational speed has already been completed.

Then, at time t13, the shift spindle 43 has returned into its initial position, the shift clutch capacity C has been changed over to a capacity C2 realized by the biasing force of the clutch spring, and a series of shift operation is finished. Note that while an example of shift-up has been described above, the driving of the shift spindle is controlled in a similar flow at the time of a shift-down.

The engine, the transmission, the type and structure of the shift clutch, the shift motor, the mechanism for interlocked driving of the shift clutch and the shift drum by use of the shift motor, the settings of the various data maps such as the estimated engine torque map, and so on are not restricted to those in the embodiment described above, and various modifications are possible. The transmission system for a vehicle according to the present invention is applicable to a variety of vehicles such as three-wheeled MUV vehicles and motorcycles.

FIG. 6 is a sectional view taken along line IV-IV of FIG. 1. A cylindrical catalyst main body 92a having a honeycomb structure is housed in the catalyst unit 92, which is enlarged in diameter in a tapered form rearwardly of the exhaust pipe 28. A pressure partition 92b for reducing fluctuations in the exhaust gas pressure is provided upstream of the catalyst main body 92a. An oxygen sensor ($O_2$ sensor) 96 for detecting the oxygen concentration in a combustion gas is attached to an external wall on the inner side in the vehicle width direction upstream of the pressure partition 92b, that is, to the taper portion 91 at the front of the catalyst unit 92.

The oxygen sensor 96 connected to a wiring 95 penetrates a catalyst unit cover 94 covering that portion of the catalyst unit 92 which ranges from an upper portion to the inner side in the vehicle width direction of the catalyst unit 92. The oxygen sensor 96 is supported by a nut-shaped support member 98 fixed to the taper portion 91. As a result, a sensor portion 96a provided at a tip of the oxygen sensor 96 is exposed to a space where pressure fluctuations are suppressed upstream of the partition wall 92b.

Here, the oxygen sensor 96 is disposed above a center line (horizontal line) H of the catalyst main body 92a directed in a roughly horizontal direction, in order to avoid adhesion thereto and accumulation thereon of water drops generated by water splash, rain, dew formation or the like during running of the vehicle. The oxygen sensor 96 is disposed substantially perpendicularly to the taper portion 91. As a result, a center line O of the oxygen sensor 96 is inclined to the front side with reference to the vehicle width direction, and inclined to the upper side with respect to the longitudinal vehicle direction.

In addition, a heat insulating cover 97 for avoiding the influence of radiant heat from the catalyst unit 92 is attached to the support member 98 for the oxygen sensor 96. The heat insulating cover 97 has a bowl-like shape including a bottom portion 97a provided with a through-hole for passing the oxygen sensor 96 therethrough, and a side wall 97b erected from an outer edge of the bottom portion 97a and inclined against the center line O of the oxygen sensor 96.

Here, in addition to water drops arising from rain, dew formation or the like, sandy dust may fall upon a main body of the oxygen sensor 96 due, for example, to swirling-up of the sandy dust by the tires of the MUV vehicle. In such a situation, the sandy dust may accumulate on the bottom portion 97a of the heat insulating cover 97, if the side wall 97b of the heat insulating cover 97 is set at an angle along the center line O. As a countermeasure against such a trouble, in this embodiment the angle of inclination of the side wall 97b against the center line O of the oxygen sensor 96 is set large, in order that a lowermost portion of the side wall 97b is inclined downward in relation to the horizontal line H, in other words, a relative angle θ is formed between the lowermost portion and the horizontal line H. This ensures that the sandy dust, if any, falling upon the heat insulating cover 97 will smoothly drop off the heat insulating cover 97.

According to the arrangement of the oxygen sensor 96 and the shape of the heat insulating cover 97 as above-mentioned, the following effects can be obtained. The influence of water on the oxygen sensor 96 can be avoided owing to the appropriately set orientation of the center line O of the oxygen sensor 96. In addition, the influence of the radiant heat from the catalyst unit 92 on the oxygen sensor 96 can be avoided, while preventing accumulation of sandy dust on the bottom portion 97a of the heat insulating cover 97, by virtue of the suitably selected angle of inclination of the side wall 97b of the heat insulating cover 97.

DESCRIPTION OF REFERENCE SYMBOLS

1 ... MUV vehicle, 35 ... Shift clutch, 41 ... Shift motor (Actuator), 43 ... Shift spindle, 45 ... Shift drum, 47 ... Shift fork, 50 ... Engine rotational speed detector or detection means, 53 ... Vehicle speed detector or detection means, 54 ... Shift spindle angle detector or detection means, 59 ... Gear positon sensor, 60 ... Control unit, 70 ... Target clutch torque calculator or calculation means, 71 ... Estimated engine torque map, 72 ... Shift-time additive torque map, 73 ... Shift-time correction coefficient map, 80 ... Target shift spindle angle calculator or calculation means, 81 ... Target shift spindle angle map, 82 ... Angle corrective amount map, E ... Engine, TM ... Transmission, Qn ... Estimated engine torque, Qm ... Target clutch torque, Qa ... Shift-time additive torque, Am ... Target shift spindle angle, G ... Gear train

What is claimed is:

1. A transmission system for a vehicle, including a transmission disposed between an engine and a driving wheel, and a shift clutch adapted to transmit, and stop transmitting, a rotational driving force between the engine and the transmission,
the transmission includes a plurality of gear trains for gear positions, a shift fork adapted to change selection among the gear trains, a shift drum adapted to drive the shift fork, and a shift spindle adapted to drive the shift drum,
the shift clutch being interlockedly actuated with the shift spindle, which is rotationally actuated by an actuator,
the transmission system comprising:
a shift spindle angle detector that detects a rotational angle of the shift spindle;
an engine rotational speed detector that detects an engine rotational speed by a crank pulser;
a vehicle speed detector including a vehicle speed sensor;
a control unit adapted to drive the actuator;
target clutch torque calculator that calculates a target clutch torque to be generated on the shift clutch based on an estimated engine torque derived from an estimated engine torque map, which prescribes a relation between the engine rotational speed, a throttle angle, and an estimated engine torque; and
a target shift spindle angle calculator that calculates a target shift spindle angle based on a value derived from a target shift spindle angle map, which prescribes a relation between the target clutch torque and the target shift spindle angle,
wherein the control unit controls the actuator based on the target shift spindle angle calculated by the target shift spindle angle calculator at a time of a gear shift of the transmission.

2. The transmission system for a vehicle according to claim 1,
wherein the target shift spindle angle calculator adds a corrective amount according to an engine rotational speed converging rate when calculating the target shift spindle angle.

3. The transmission system for a vehicle according to claim 2,
wherein the target shift spindle angle calculator adds a corrective amount derived from shifts carried out so far, as a learned value, when calculating the target shift spindle angle.

4. The transmission system for a vehicle according to claim 3, further comprising
a plurality of shift-time additive torque maps according to the gear positions before and after a gear shift,
wherein the target clutch torque calculator adds a shift-time additive torque derived by use of the shift-time additive torque map as a corrective amount when calculating the target clutch torque.

5. The transmission system for a vehicle according to claim 4,
wherein the target clutch torque calculator calculates the target clutch torque through multiplying the target torque, which is obtained through the addition of the shift-time additive torque, by a correction coefficient prescribed taking a clutch slip ratio into account.

6. The transmission system for a vehicle according to claim 2, further comprising
a plurality of shift-time additive torque maps according to the gear positions before and after a gear shift,
wherein the target clutch torque calculator adds a shift-time additive torque derived by use of the shift-time additive torque map as a corrective amount when calculating the target clutch torque.

7. The transmission system for a vehicle according to claim 6,
wherein the target clutch torque calculator calculates the target clutch torque through multiplying the target torque, which is obtained through the addition of the shift-time additive torque, by a correction coefficient prescribed taking a clutch slip ratio into account.

8. The transmission system for a vehicle according to claim 1,
wherein the target shift spindle angle calculator adds a corrective amount derived from shifts carried out so far, as a learned value, when calculating the target shift spindle angle.

9. The transmission system for a vehicle according to claim 8, further comprising
a plurality of shift-time additive torque maps according to the gear positions before and after a gear shift,
wherein the target clutch torque calculator adds a shift-time additive torque derived by use of the shift-time additive torque map as a corrective amount when calculating the target clutch torque.

10. The transmission system for a vehicle according to claim 9,
wherein the target clutch torque calculator calculates the target clutch torque through multiplying the target torque, which is obtained through the addition of the shift-time additive torque, by a correction coefficient prescribed taking a clutch slip ratio into account.

11. The transmission system for a vehicle according to claim 1, further comprising
a plurality of shift-time additive torque maps according to the gear positions before and after a gear shift,
wherein the target clutch torque calculator adds a shift-time additive torque derived by use of the shift-time additive torque map as a corrective amount when calculating the target clutch torque.

12. The transmission system for a vehicle according to claim 11,
wherein the target clutch torque calculator calculates the target clutch torque through multiplying the target torque, which is obtained through the addition of the shift-time additive torque, by a correction coefficient prescribed taking a clutch slip ratio into account.

* * * * *